(12) United States Patent
Chen et al.

(10) Patent No.: US 12,431,820 B2
(45) Date of Patent: Sep. 30, 2025

(54) POWER CONDITIONER WITH NEUTRAL LINE OFFSET CURRENT COMPENSATION FUNCTION AND CONTROL METHOD THEREOF

(71) Applicant: National Taiwan University, Taipei (TW)

(72) Inventors: Yaow-Ming Chen, Taipei (TW); Irham Fadlika, Taipei (TW); Wen-Yen Li, Taipei (TW)

(73) Assignee: National Taiwan University, Taipei (TW)

( * ) Notice: Subject to any disclaimer, the term of this patent is extended or adjusted under 35 U.S.C. 154(b) by 202 days.

(21) Appl. No.: 18/532,703

(22) Filed: Dec. 7, 2023

(65) Prior Publication Data

US 2025/0141334 A1    May 1, 2025

(30) Foreign Application Priority Data

Oct. 25, 2023  (TW) .................................. 112140909

(51) Int. Cl.
*H02M 7/5387* (2007.01)
*H02M 1/00* (2006.01)
(Continued)

(52) U.S. Cl.
CPC ..... *H02M 7/53873* (2013.01); *H02M 1/0009* (2021.05); *H02M 1/0012* (2021.05);
(Continued)

(58) Field of Classification Search
CPC ............ H02M 1/0012; H02M 1/0009; H02M 1/0025; H02M 1/088; H02M 1/123; H02M 7/53871; H02M 7/53873
See application file for complete search history.

(56) References Cited

U.S. PATENT DOCUMENTS 4,757,434 A * 7/1988 Kawabata ......... H02M 7/53873
363/41
5,790,396 A * 8/1998 Miyazaki ............. H02M 7/487
363/58
(Continued)

FOREIGN PATENT DOCUMENTS

| CN | 103138595 | 6/2013 |
|---|---|---|
| CN | 113224963 | 8/2021 |
| JP | 6544170 | 7/2019 |

*Primary Examiner* — Yusef A Ahmed
(74) *Attorney, Agent, or Firm* — Best & Flanagan LLP

(57) ABSTRACT

A power conditioner with neutral line offset current compensation function, includes a power converter, a measurement unit, a control module, and two coupling capacitors connected through the neutral line to a three-phase AC grid. The power conditioner eliminates the offset current on the neutral line by compensating the inaccuracies in the measurement unit with the control module, thus minimizing the voltage deviation of the coupling capacitors. Compared to traditional control circuits, a feedback path is added to achieve the elimination of the neutral line offset current, suppressing unstable and unpredictable voltage fluctuations on the coupling capacitors without affecting the rated power transmission of the power converter, thus extending the lifespan of the coupling capacitors and enabling the power conditioner to operate more stably.

10 Claims, 15 Drawing Sheets

(51) Int. Cl.
*H02M 1/088* (2006.01)
*H02M 1/12* (2006.01)

(52) U.S. Cl.
CPC ......... *H02M 1/0025* (2021.05); *H02M 1/088* (2013.01); *H02M 1/123* (2021.05); *H02M 7/53871* (2013.01)

(56) References Cited

U.S. PATENT DOCUMENTS

| | | | | |
|---|---|---|---|---|
| 8,508,166 B2* | 8/2013 | Marcinkiewicz | ....... | H02P 23/26 318/729 |
| 8,610,388 B2* | 12/2013 | Ito | ........... | H02P 21/18 318/400.14 |
| 2006/0133120 A1* | 6/2006 | Sato | ........... | H02M 5/4585 363/37 |
| 2006/0215429 A1* | 9/2006 | Oka | ........... | H02P 21/22 363/97 |
| 2007/0247121 A1* | 10/2007 | Wu | ........... | G05F 1/70 323/222 |
| 2010/0302825 A1* | 12/2010 | Ohshima | ........... | H02M 7/53871 363/131 |
| 2011/0141786 A1* | 6/2011 | Shen | ........... | H02M 7/487 363/131 |
| 2012/0212191 A1* | 8/2012 | Yuzurihara | ........ | H02M 3/1584 323/205 |
| 2013/0057297 A1* | 3/2013 | Cheng | ........... | H02M 7/539 324/548 |
| 2013/0294127 A1* | 11/2013 | Ohshima | ........... | H02M 7/53871 363/95 |
| 2015/0016159 A1* | 1/2015 | Deboy | ........... | H02M 7/53873 363/71 |
| 2015/0048805 A1* | 2/2015 | Lin | ........... | H02P 9/48 322/28 |
| 2015/0280597 A1* | 10/2015 | Takase | ........... | H02M 5/297 323/271 |
| 2016/0111975 A1* | 4/2016 | Hasegawa | ........... | H02M 7/487 363/97 |
| 2017/0302206 A1* | 10/2017 | Hamada | ........... | H02M 7/4833 |
| 2018/0287509 A1* | 10/2018 | Fujii | ........... | H02M 7/4835 |
| 2019/0237972 A1* | 8/2019 | Wang | ........... | H02M 1/34 |
| 2020/0185960 A1* | 6/2020 | Toyoda | ........... | H02M 7/487 |
| 2020/0204057 A1* | 6/2020 | Kato | ........... | H02M 7/53871 |
| 2020/0259445 A1* | 8/2020 | Irie | ........... | H02M 3/158 |
| 2021/0006195 A1* | 1/2021 | Maeda | ........... | B60L 15/20 |
| 2021/0021224 A1* | 1/2021 | Niimura | ........... | H02M 7/49 |
| 2022/0190741 A1* | 6/2022 | Katoh | ........... | H02M 7/539 |

* cited by examiner

POWER CONDITIONER WITH NEUTRAL LINE OFFSET CURRENT COMPENSATION FUNCTION AND CONTROL METHOD THEREOF

CROSS-REFERENCE TO RELATED APPLICATIONS

This application claims the priority benefit of TW application serial No. 112140909, filed on Oct. 25, 2023. The entirety of the above-mentioned patent application is hereby incorporated by reference herein and made a part of the specification.

BACKGROUND OF THE INVENTION

1. Field of the Invention

The present invention relates to a power conditioner and control method thereof, particularly a power conditioner with neutral line offset current compensation function and control method thereof

2. Description of the Related Art

With reference to FIG. 7, a power conditioner is a circuit used to convert direct current (DC) power into alternating current (AC) power. For example, the power converter is often used as in the process of integrating a DC power source into the utility grid. Taking the common three-phase AC grid as an example, the power conditioner comprises a power converter 5, an upper capacitor C1, a lower capacitor C2, and a measurement circuit and control module (not shown in the figure). The upper capacitor C1 and lower capacitor C2 are coupling separated capacitors, and their connection points are linked to the neutral point n of the three-phase AC grid via a neutral line. The measurement module is connected to the three-phase output end, measuring the three-phase output currents $i_a$, $i_b$, $i_c$, and output voltages $v_a$, $v_b$, $v_c$, which are then fed back to the control module to enable the control module to independently control the real power and reactive power of each phase through the power converter 5.

However, errors in current measurement may exist due to factors like circuit aging in the measurement module or component mismatch. That is, the feedback current value received by the control module may slightly deviate from the actual current value. This error will persist when calculating the difference between the reference current value and feedback current value and will be further converted into a control signal output through the error amplifier. When the control module operates based on the Pulse Width Modulation (PWM) signal, a neutral line offset current will be generated.

As the measurement and control of each phase current are independently carried out, offset currents $i_{ext,a}$, $i_{ext,b}$, $i_{ext,c}$ will appear on the harmonic currents $i_a$, $i_b$, $i_c$ of each phase in the three-phase AC. Since the offset currents $i_{ext,a}$, $i_{ext,b}$, $i_{ext,c}$ are relatively small compared to the expected harmonic currents $i_a$, $i_b$, $i_c$, and the polarity of the offset currents $i_{ext,a}$, $i_{ext,b}$, $i_{ext,c}$ is uncertain, it is challenging to separate and control them when superimposed. Eventually, the offset currents will converge and flow through the neutral line towards the coupling separated capacitors, creating a total current on the neutral line of $i_a+i_b+i_c+i_{ext,a}+i_{ext,b}+i_{ext,c}$. This results in a voltage deviation $\Delta v$ in the upper capacitor C1 and lower capacitor C2. Given that the upper capacitor C1 and lower capacitor C2 are connected in series to the DC input power source with a total voltage of Vdc, the voltage on the upper capacitor C1 is $Vdc/2+\Delta v$, and the voltage on the lower capacitor C2 is $Vdc/2-\Delta v$. When the offset current on the neutral line is positive, since the DC voltage value remains constant, the voltage of the upper capacitor C1 will discharge over time, causing its voltage to drop, while the voltage of the lower capacitor C2 will rise. Conversely, when the offset current on the neutral line is negative, the voltage of the upper capacitor C1 will increase, and the voltage of the lower capacitor C2 will decrease. The deviation of the capacitor voltage from the midpoint of the DC voltage Vdc will impact the operation of the power conditioner, potentially harming the AC grid.

Test results of a simulated power conditioner under simulated AC current measurement errors are provided herein. Table 1 lists the parameters of the power conditioner used for simulation and the three-phase four-wire AC grid. The simulation tests include three different sets of three-phase target real and reactive power values and measurement error amounts.

TABLE 1

| | |
|---|---|
| Power converter rated power: | 3.5 kVA |
| Rated three-phase voltage RMS ($v_a$, $v_b$, $v_c$): | 220 V |
| DC-end voltage | 720 V |
| Inductance (L) value: | 1.5 mH |
| Capacitor (C1, C2) value | 1 mF |
| PWM control signal frequency ($v_{ga1}$-$v_{ga2}$, $v_{gb1}$-$v_{gb2}$, $v_{gc1}$-$v_{gc2}$) | 30 kHz |

First test scenario: All three phases having a target real power value of Pref=1 kW and a target reactive power value of Qref=0.5 KVA, and a set current measurement error for each phase of +0.5 A. FIGS. 8A to 8D sequentially show the simulated result waveforms over time for the three-phase AC voltage $v_a$, $v_b$, $v_c$, three-phase AC currents $i_a$, $i_b$, $i_c$, three-phase current offsets $i_{ext,a}$, $i_{ext,b}$, $i_{ext,c}$, and the voltages of the upper and lower capacitors vc1 and vc2. In the first test scenario, the obtained offset current is positive, causing the voltage of the upper capacitor C1 to decrease over time, while the voltage of the lower capacitor C2 will gradually increase, both deviating from the DC voltage midpoint (i.e., 360 V).

Second test scenario: Three-phase target real and reactive powers both have a target real power value of Pref=1 kW and a target reactive power value of Qref=0.5 KVA, and a set current measurement error for each phase of −0.5 A. FIGS. 9A to 9D sequentially show the simulated result waveforms over time for the same parameters as the first test scenario. In the second test scenario, the obtained offset current is negative, causing the voltage of the upper capacitor C1 to increase over time, while the voltage of the lower capacitor C2 will gradually decrease, both deviating from the DC voltage midpoint.

Third test scenario: Three-phase target real and reactive powers have varied target values for each phase with Prefa=1 kW, Prefb=0.8 kW, Prefc=1.2 kW and Qrefa=0.4 KVA, Qrefb=0.6 KVA, Qrefc=0.3 KVA, and a set current measurement error for each phase of +0.2 A, −0.3 A, and +0.1 A respectively for phases a, b, and c. FIGS. 10A to 10D sequentially show the simulated result waveforms over time for the same parameters. In the third test scenario, due to the variations in target power and measurement errors for each phase, the resulting offset currents differ for each phase. As a result, the voltages of the capacitors C1 and C2 deviate from the DC voltage midpoint in an irregular manner.

In conclusion, when there are errors in the AC current measurement, these errors will cause the voltages of the upper and lower capacitors to deviate from the midpoint of the DC voltage, which could harm the grid. The results emphasize the need for accurate AC current measurements and robust control techniques to prevent such deviations and ensure the safe operation of power conditioners connected to the AC grid.

SUMMARY OF THE INVENTION

To achieve the foregoing objective, the power conditioner with neutral line offset current compensation function comprises:

- a power conversion module, having two DC input terminals connected to the DC source and at least one AC output terminal connected to the AC grid; and including two capacitors connected in series between the two DC output terminals, with one connection point of the two capacitors connected to a neutral point of the AC grid;
- at least one measurement unit, connected to the at least one AC output terminal of the power conversion module for voltage and current measurements, and generating a measured voltage value and a measured current value;
- at least one control module, connected to the at least one measurement unit and the power conversion module, generating an ideal control command based on a target power information and the measured voltage value, and comprising a compensation computation mechanism; the compensation computation mechanism performing signal compensation on the ideal control command to produce a compensated control command; the control module producing and outputting a pulse width modulation (PWM) signal to the power conversion module based on the compensated control command; the compensation computation mechanism comprising:
- subtracting a target current value from the measured current value to obtain a first difference value; subtracting a feedback value from the first difference value and passing the subtracted outcome through a first proportional amplifier to produce a first proportional amplified difference value; passing the first difference value through an integral amplifier to produce a first integral amplified difference; passing the first integral amplified difference through a second proportional amplifier to produce the feedback value; wherein
- the first integral amplified difference and the first proportional amplified difference are used to compensate the ideal control command.

Through the control module executing the aforementioned compensation operation mechanism during the generation of the Pulse Width Modulation (PWM) control signal, the component caused by measurement errors in the ideal control command is eliminated, thereby eliminating the offset current at the neutral point of the coupling capacitors. Since the elimination of measurement errors is carried out through the compensation operation mechanism within the control module, errors can be appropriately eliminated and compensated through the feedback path regardless of the polarity of the measurement errors, effectively preventing operational anomalies in the power conditioner due to the voltage at the capacitor's neutral point. Furthermore, this invention does not require extra capacitor voltage control circuitry in the power conditioner, maintaining the voltage at the neutral points of both capacitors at the DC voltage neutral point with minimal cost increase.

DETAILED DESCRIPTION OF THE INVENTION

Figure 1:
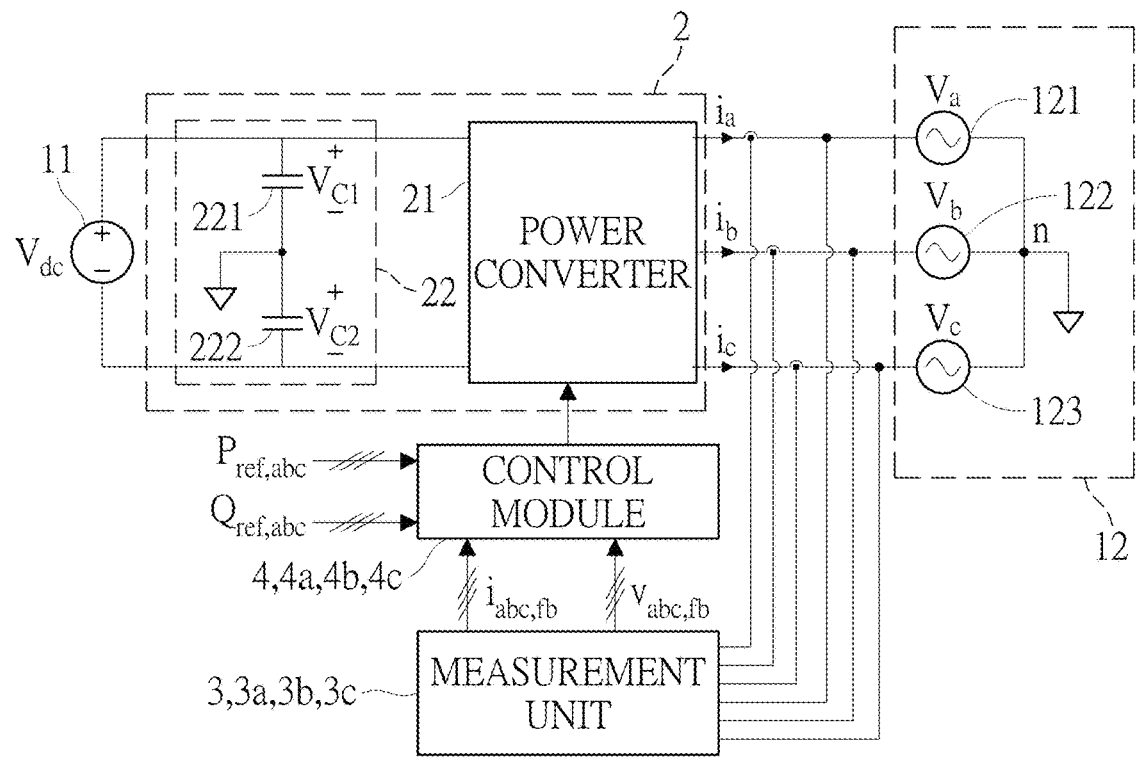
FIG. 1 is a block diagram of the circuit architecture of the power conditioner with neutral line offset current compensation function (hereinafter referred to as "power conditioner") of the present invention.

With reference to FIG. 1, a power conditioner having a neutral line offset current compensation function (hereinafter referred to as the "power conditioner") is connected between a DC power source 11 and an AC power grid 12 to control power transmission between the DC power source 11 and the AC power grid 12. The DC power source 11 provides a DC voltage $V_{dc}$. In the figures and subsequent descriptions of this invention, the AC power grid 12 will be described with the assumption of being a three-phase-four-wire AC power grid 12, but the invention is not limited to such configuration. The AC power grid 12 has a neutral point n and three phase terminals 121-123, specifically, the first phase terminal 121, the second phase terminal 122, and the third phase terminal 123, providing three-phase AC voltages $v_a$, $v_b$, and $v_c$, respectively.

The power conditioner includes a power converting module 2, at least one measurement unit 3, and at least one control module 4. The number of AC output ends of the power converting module 2, the at least one measurement unit 3, and the at least one control module 4 each match the number of phases of the AC power grid 12. In other words, the at least one measurement unit 3 includes measurement units 3a, 3b, and 3c, and the at least one control module 4 includes control modules 4a, 4b, and 4c. It should be noted that, for clarity in FIG. 1, the measurement units 3a, 3b, and 3c are collectively represented as a single block, and the control modules 4a, 4b, and 4c are also collectively represented as a single block. The measurement unit 3a is connected to phase terminal 121 to measure its AC voltages $v_a$ and the controlled AC currents $i_a$ output from the power converter 21. The control module 4a is connected to the measurement unit 3a to receive the measured voltage value and measured current value, and controls the AC voltage $v_a$ and AC current $i_a$ that the power converting module 2 transmits to the phase terminal 121. The same applies to the measurement units 3b and 3c, control modules 4b and 4c, and phase terminals 122 and 123, which will not be elaborated further here.

The power conversion module 2 has two DC input terminals connected to the DC power source 11, and at least one AC output terminal connected to the phase terminals 121-123 of the AC power grid 12. The power conversion module 2 further includes a power converter 21 and a coupling separated capacitor set 22. The coupling separated capacitor set 22 consists of two capacitors with identical capacitance values, specifically, the upper capacitor 221 and the lower capacitor 222. the upper capacitor 221 and the lower capacitor 222 are connected in series between the two DC input terminals, and a connection point between the upper capacitor 221 and the lower capacitor 222 is connected to the neutral point n of the AC power grid 12 through a neutral line. The power converter 21 is connected between the coupling separated capacitor set 22 and the AC output terminal, receiving PWM signals from the control module 4. Based on the PWM signals, the power converter 21 converts the DC voltage from the DC power source 11 and respectively outputs the controlled AC currents $i_a$, $i_b$, and $i_c$ to the phase terminals 121-123 of the AC power grid 12.

Figure 2:
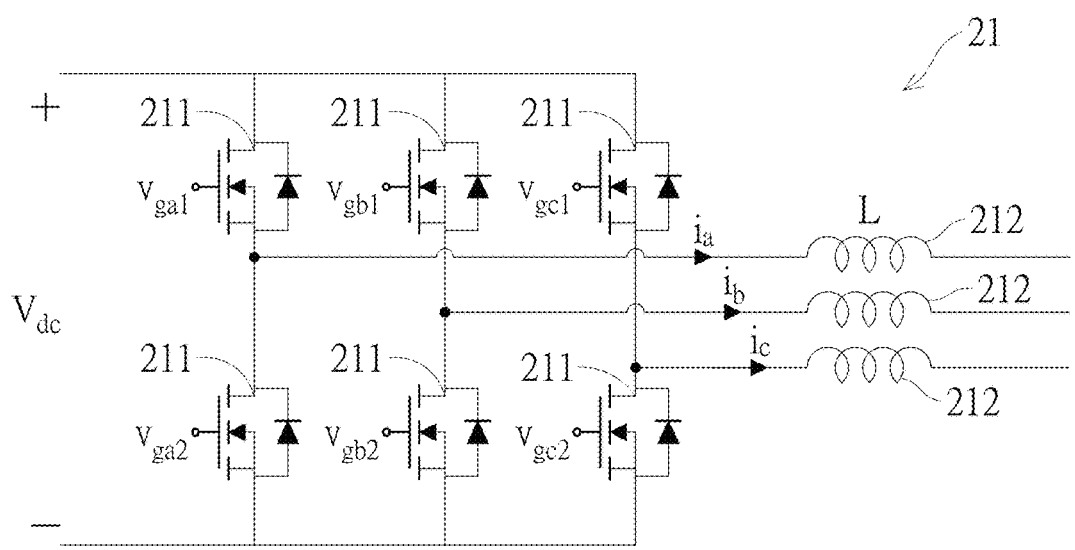
FIG. 2 is a circuit diagram of the power converter within the power conditioner of the present invention.

With reference to FIG. 2, the power converter 21 consists of multiple switches 211 and at least one inductor 212. Taking the three-phase AC output as an example, the power converter 21 contains six switches 211 and three inductors 212. The switches 211 are paired and connected in series between the DC power source terminals, representing an upper-arm switch and a lower-arm switch, respectively. Each connection point between the serially-connected switches 211 is connected to one of the phase terminals 121~123 through the inductor 212. The paired switches 211 each have a control terminal to receive paired PWM control signals $v_{ga1}$-$v_{ga2}$, $v_{gb1}$-$v_{gb2}$, and $v_{gc1}$-$v_{gc2}$ from the control module 4.

Further with reference to FIG. 1, each measurement unit 3 is connected to the AC output terminal, measuring the AC voltage and the controlled AC current outputted by the power conversion module 21, generating a measured voltage value and a measured current value. Each control module 4 is connected to the measurement unit 3 to receive the measured voltage value and measured current value, and receives a target power information from an external controller (not shown in the figures herein). The target power information includes a target real power value and a target reactive power value. The control module 4 executes the control method of the power conditioner of the present invention, generating the PWM signal according to the target power information, the measured voltage value and the measured current value. In the aforementioned symbols, the subscript "a,b,c" denotes the endpoints of each phase connected to the three-phase AC power grid.

To be more specific, the control module 4 generates an ideal control signal $v_{s1,x}$ based on the target real power value $P_{ref,abc}$, target reactive power value $Q_{ref,abc}$, and the measured voltage value $v_{abc,fb}$. Furthermore, the control module contains a compensation computation mechanism, which compensates the ideal control signal $v_{s1,x}$ to produce a compensated control signal $v_{s2,x}$. The control module 4, based on the compensated control signal $v_{s2,x}$, generates and outputs PWM control signals $v_{gx1}$-$v_{gx2}$ to the power conversion module 2. The compensation computation mechanism involves the following steps: Subtracting a target current value from the measured current value to obtain a first difference value; subtracting a feedback value from the first difference value and passing the subtracted outcome through a first proportional amplifier to produce a first proportional amplified difference value; passing the first difference value through an integral amplifier to produce a first integral amplified difference; passing the first integral amplified difference through a second proportional amplifier to produce the feedback value. The integral amplified difference value and the first proportional amplified difference value are used to compensate the ideal control signal $v_{s1,x}$, resulting in the compensated control signal $v_{s2,x}$. In the subscript symbols, the "x" represents any phase terminal in the three-phase AC power grid.

For clarity, each measurement unit 3 is respectively connected to each phase terminal 121, 122, 123 to measure AC voltages $v_a$, $v_b$, $v_c$ and the AC currents $i_a$, $i_b$, $i_c$ outputted by the power conversion module 2. Each control module 4 is connected to its corresponding measurement unit 3 to receive the measured voltage values $v_{abc,fb}$ and the measured current values $i_{abc,fb}$ of that phase. The control module 4 also is connected to the switches 211 of each corresponding phase, outputting paired PWM control signals $v_{ga1}$-$v_{ga2}$, $v_{gb1}$-$v_{gb2}$, and $v_{gc1}$-$v_{gc2}$ to control the switches 211 to toggle between conduction state and cutoff state, thereby controlling the output of each phase. The operations between the measurement units 3 and the control modules 4 are independent, ensuring that the AC voltages $v_a$, $v_b$, $v_c$ and AC currents $i_a$, $i_b$, $i_c$ delivered to the AC power grid 12 are independently detected and controlled. Under the circuit structure of such, the power converter of the present invention can achieve at least the following objectives:
  (a) The real and reactive powers of the three-phase output are stabilized at their target values.
  (b) The offset current on the neutral line is eliminated.
  (c) The voltages on the capacitors 121, 122 of the coupling separated capacitor set 22 are stabilized near the midpoint of the DC voltage Vdc.

The operating principles of a corresponding set of the measurement unit 3, control module 4, and switches 211 will be described below. The same circuit architecture and control principle can be applied to the measurement units 3a, 3b, 3c and control modules 4a, 4b, 4c of any phase in the power converter, achieving the effect of eliminating the measurement error in the measured current value $i_{abc,fb}$ produced by any measurement unit 3a, 3b, 3c.

Figure 3:
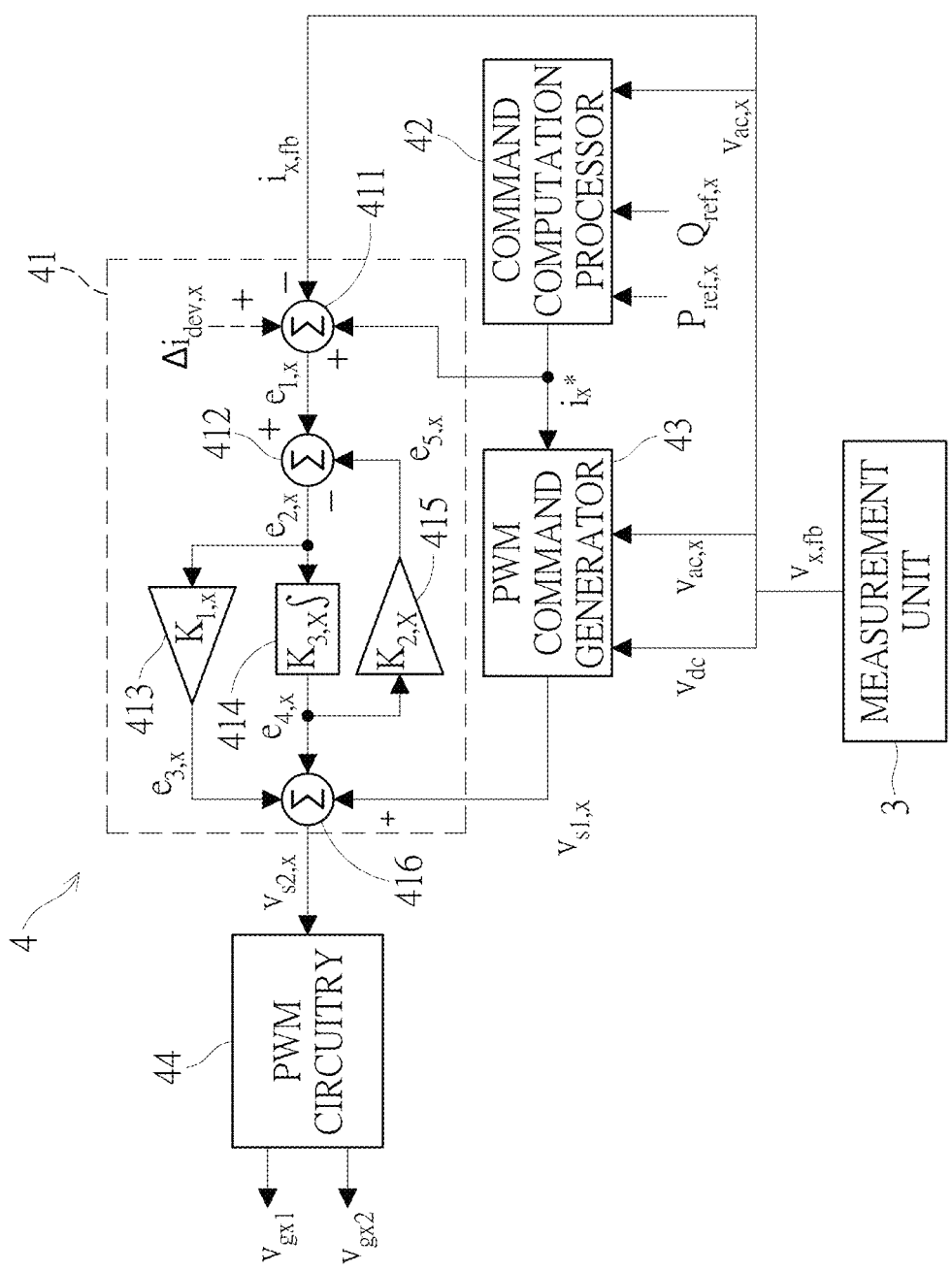
FIG. 3 is a block diagram of the circuit architecture of the control module within the power conditioner of the present invention.
Figure 4A:
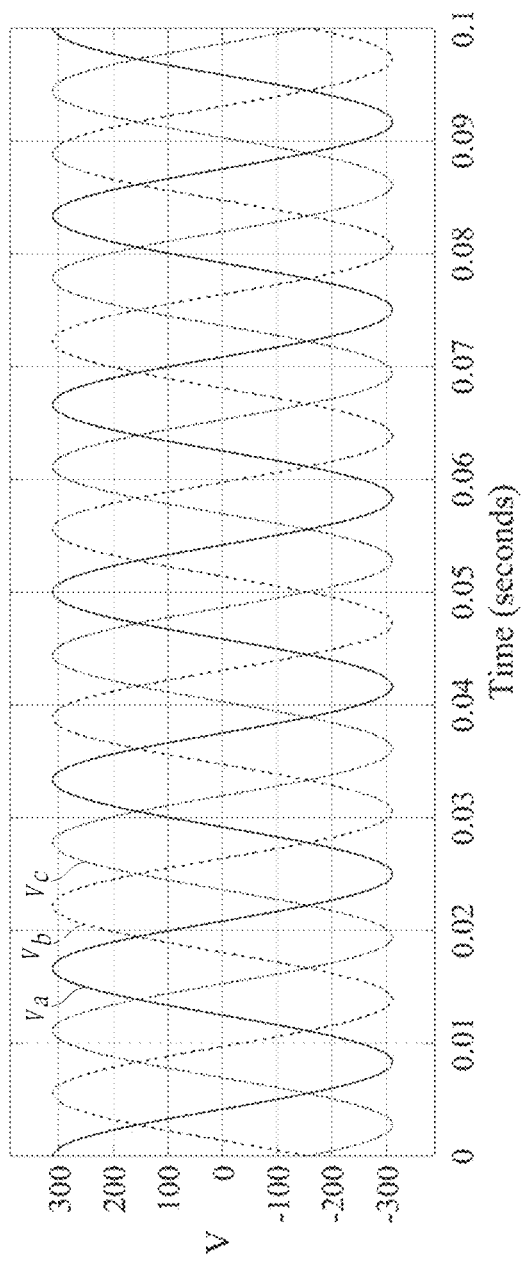
FIGS. 4A to 4D are waveform diagrams over time for the three-phase AC voltages, three-phase AC currents, three-phase current offsets, and capacitor voltages during the first test scenario of the power conditioner of the present invention.
Figure 4B:
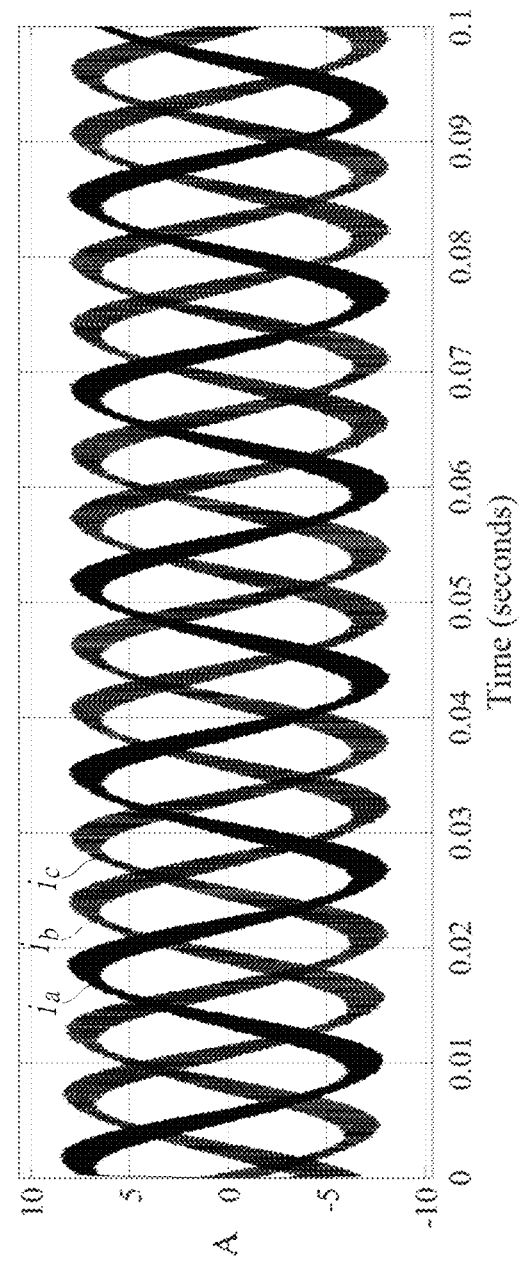
Figure 4C:
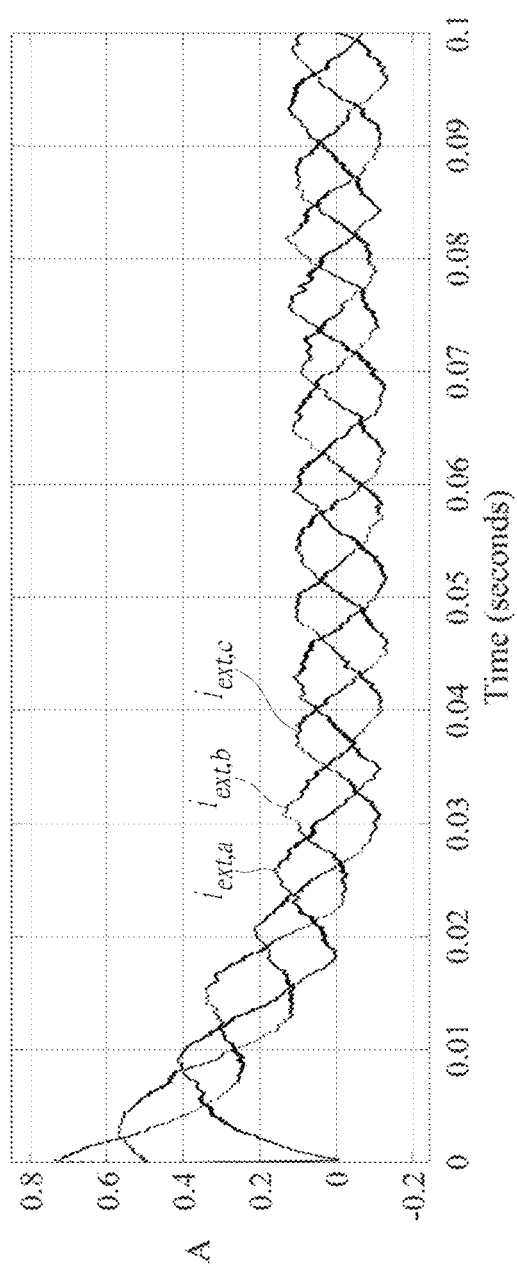
Figure 4D:
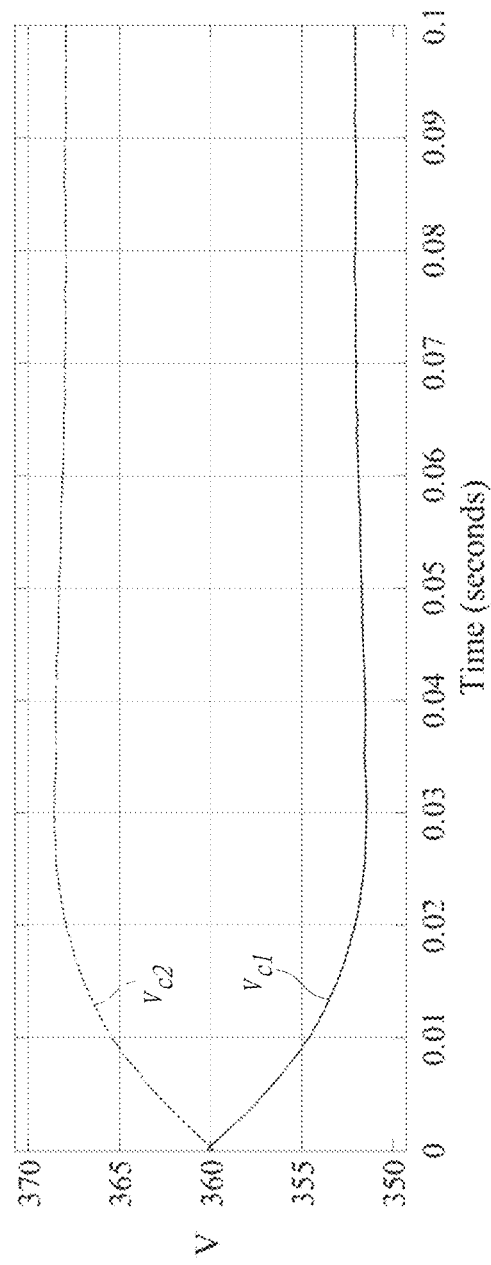
Figure 5A:
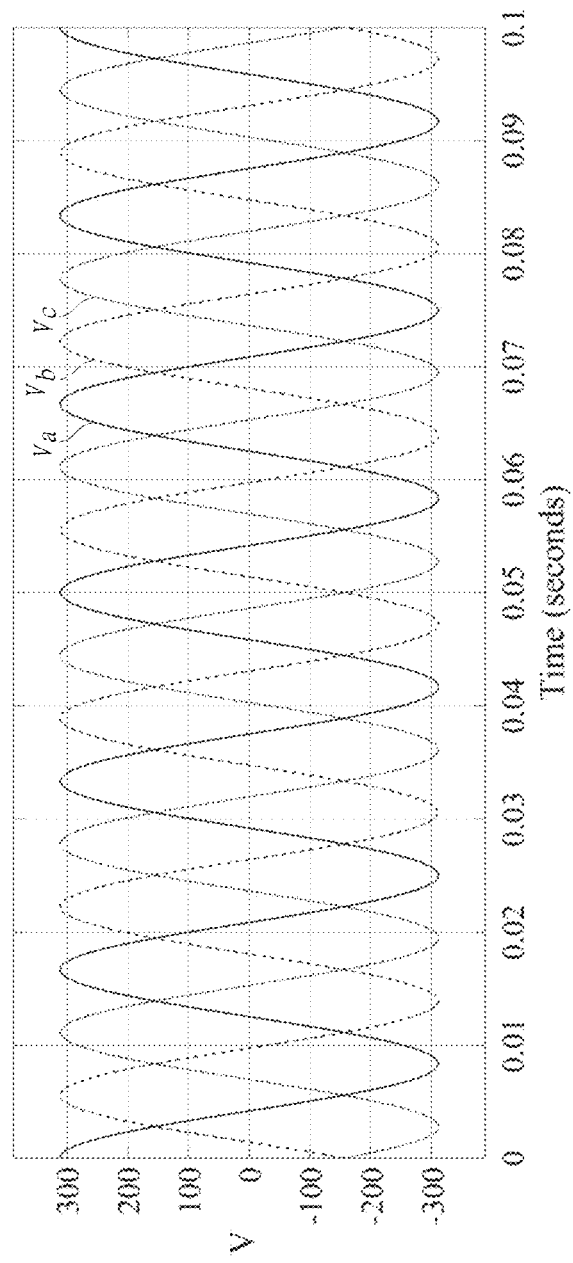
FIGS. 5A to 5D are waveform diagrams over time for the three-phase AC voltages, three-phase AC currents, three-phase current offsets, and capacitor voltages during the second test scenario of the power conditioner of the present invention.
Figure 5B:
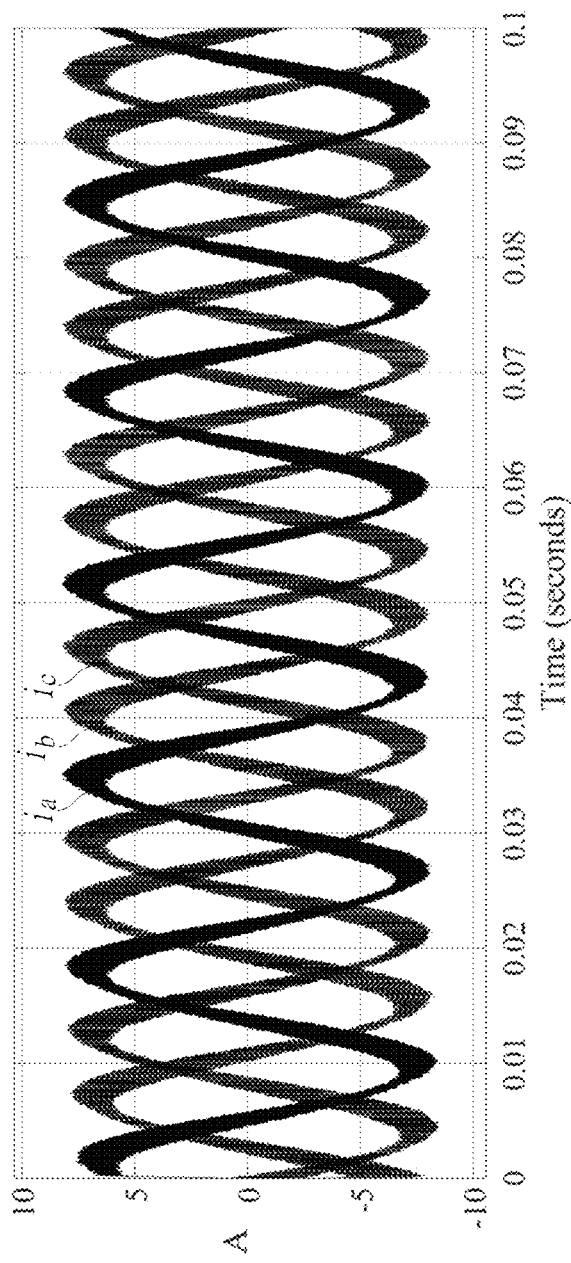
Figure 5C:
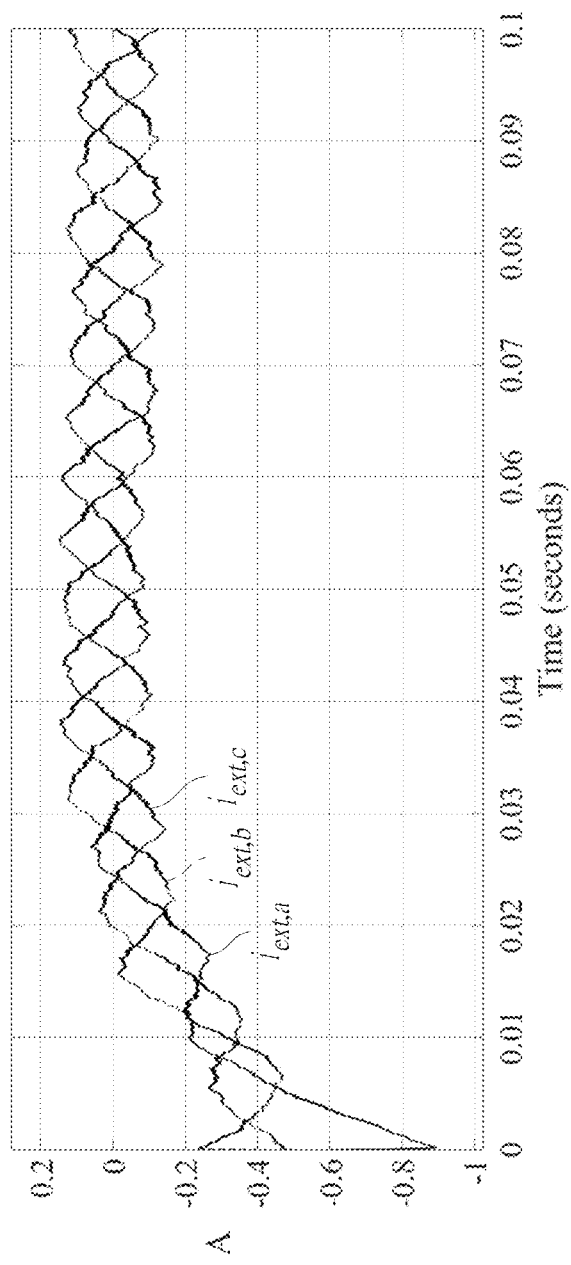
Figure 5D:
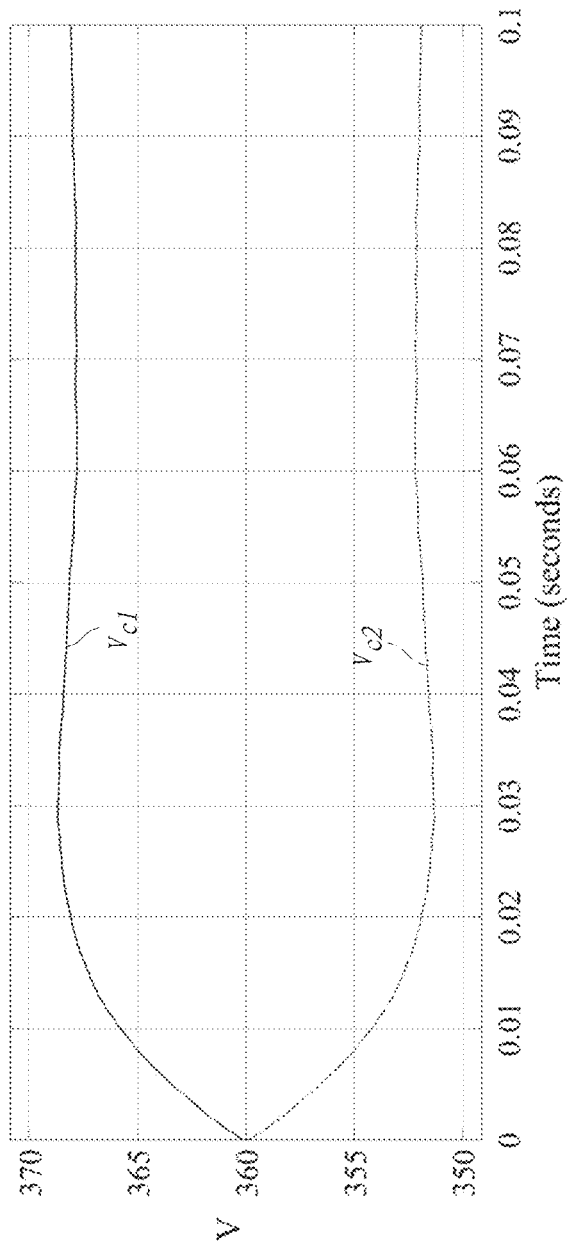
Figure 6A:
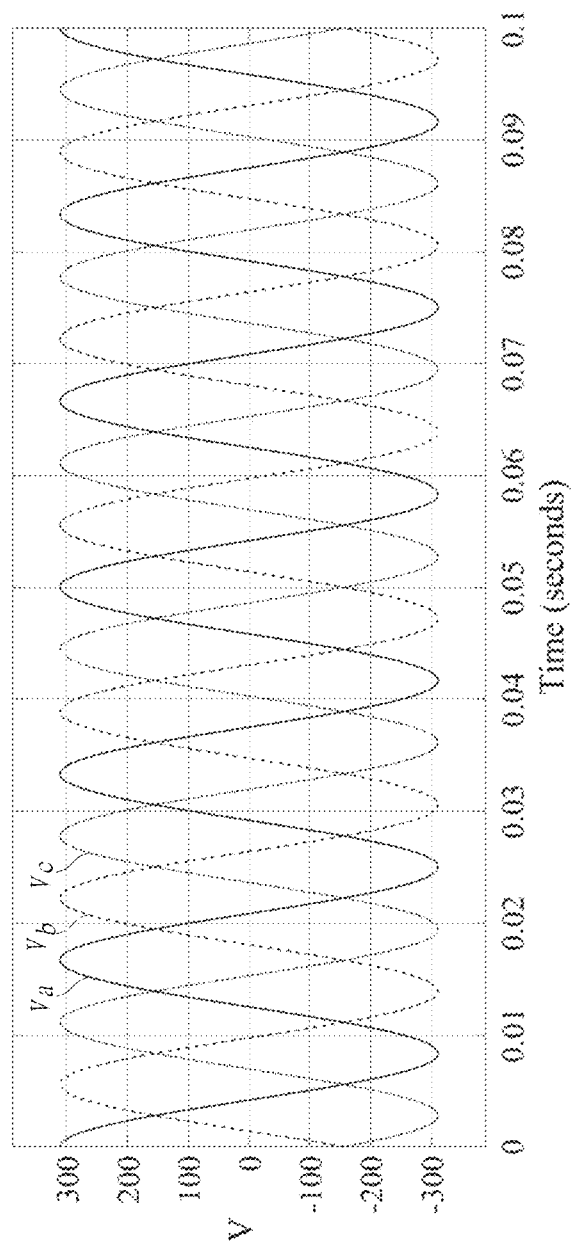
FIGS. 6A to 6D are waveform diagrams over time for the three-phase AC voltages, three-phase AC currents, three-phase current offsets, and capacitor voltages during the third test scenario of the power conditioner of the present invention.
Figure 6B:
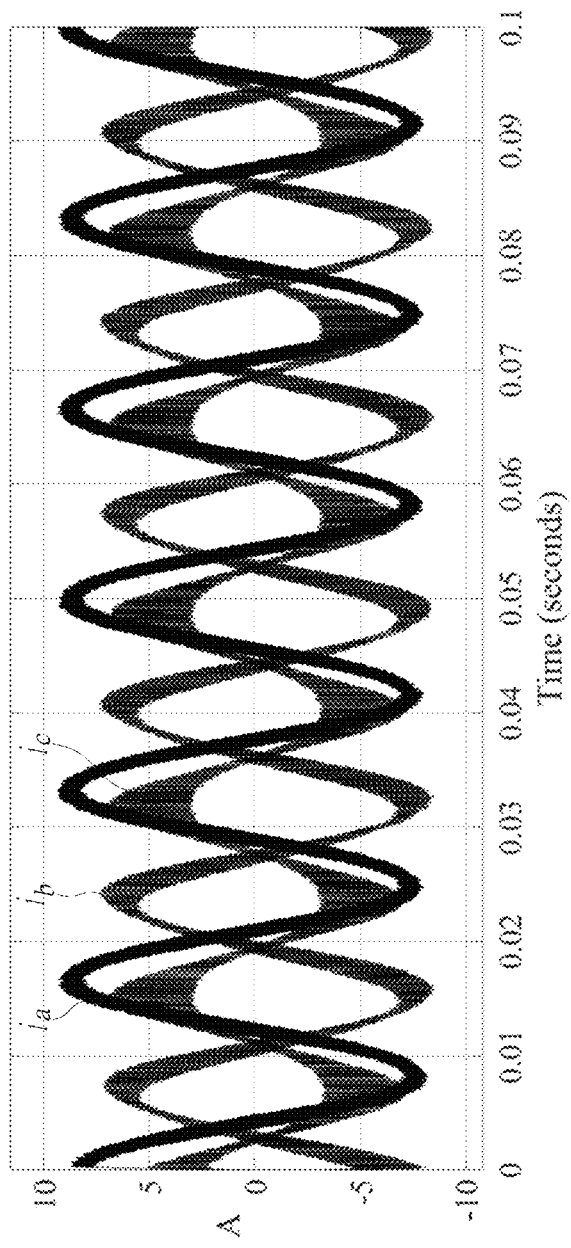
Figure 6C:
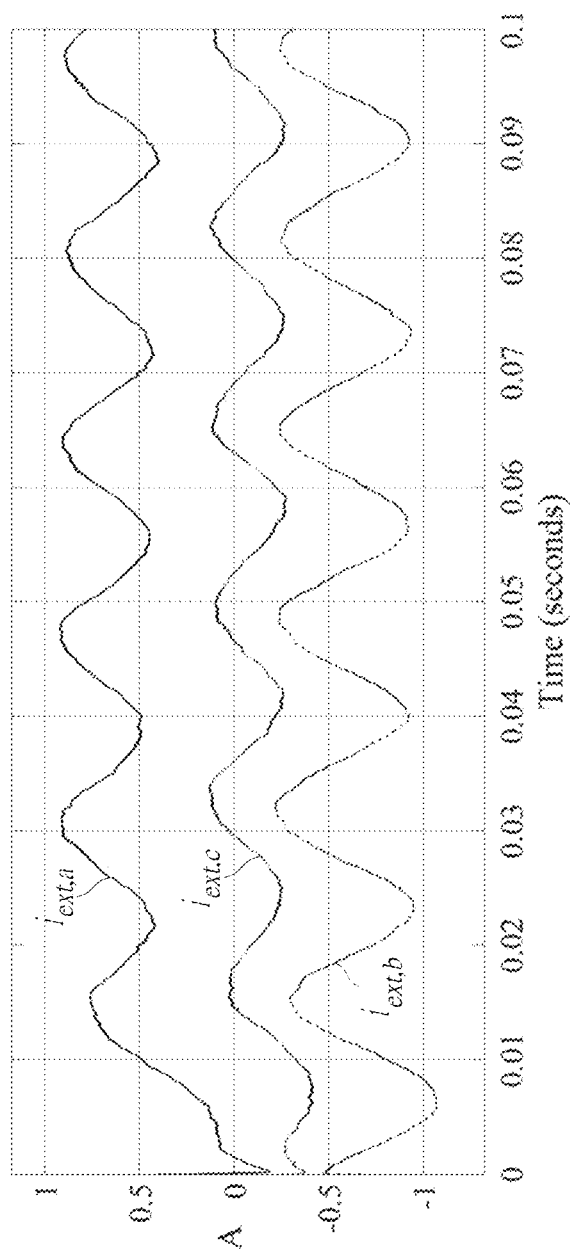
Figure 6D:
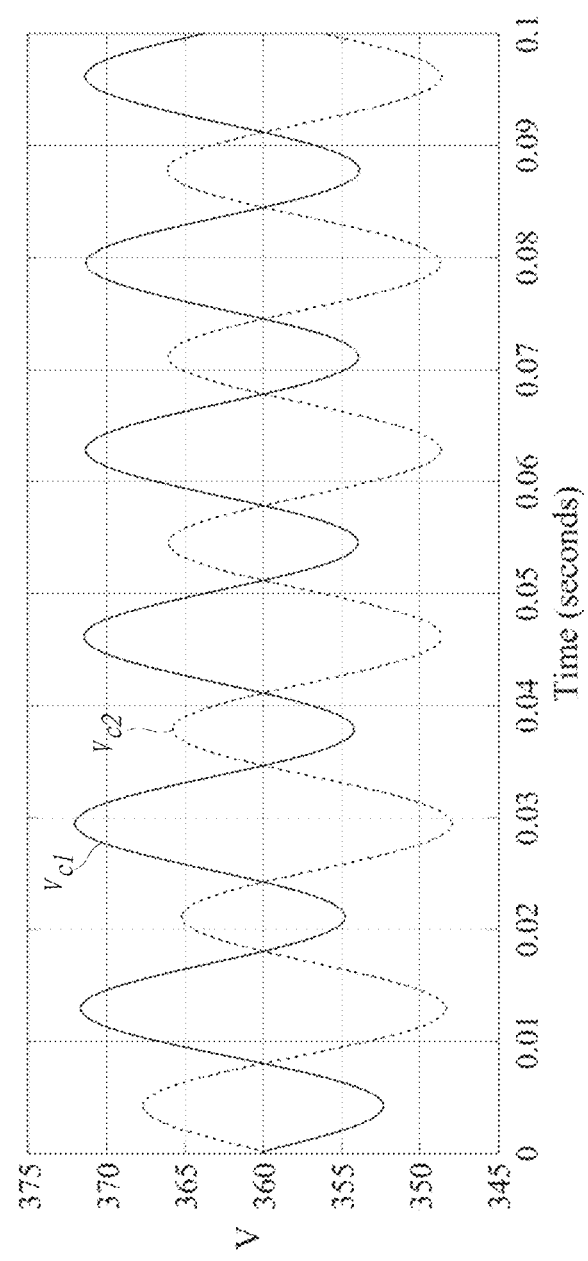
Figure 7:
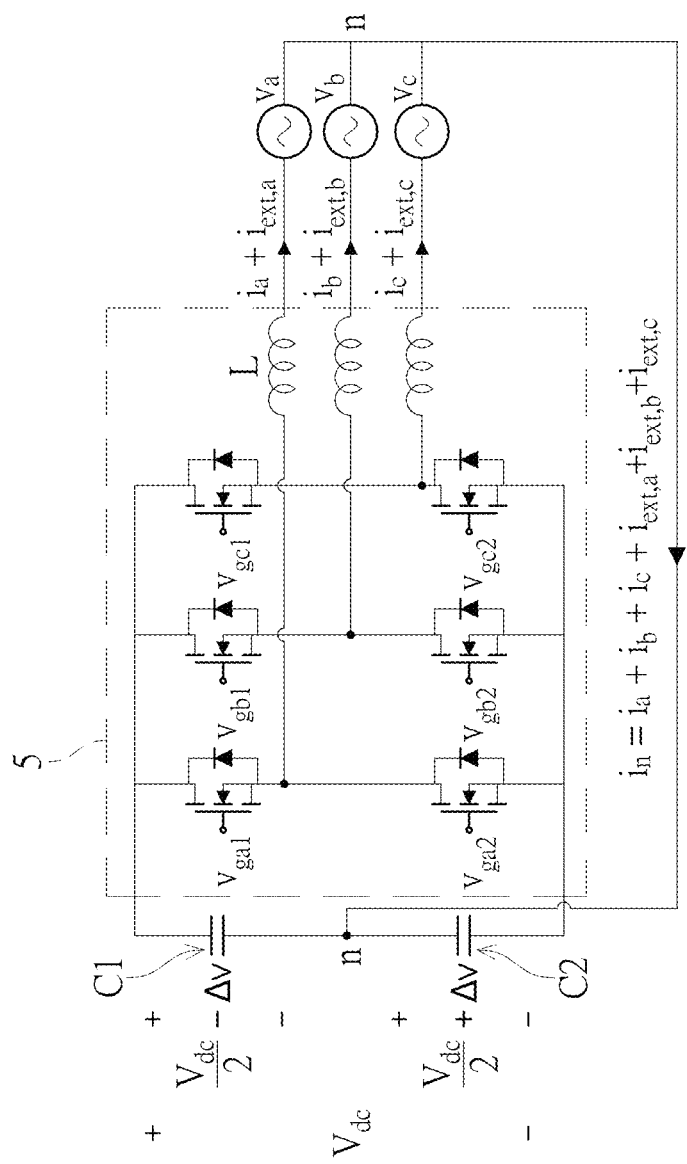
FIG. 7 is a schematic diagram of the process of capacitor voltage deviation caused by the flow of neutral line offset current into the neutral point in a power converter.
Figure 8A:
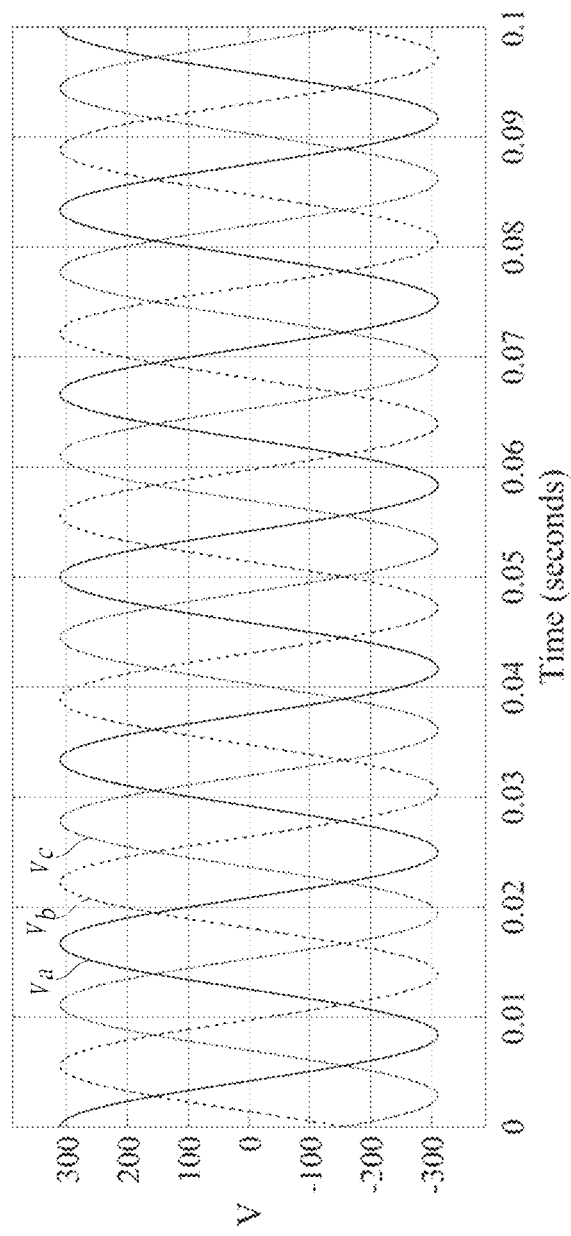
FIGS. 8A to 8D are waveform diagrams over time for the three-phase AC voltages, three-phase AC currents, three-phase current offsets, and capacitor voltages during the first test scenario of a conventional power conditioner.
Figure 8B:
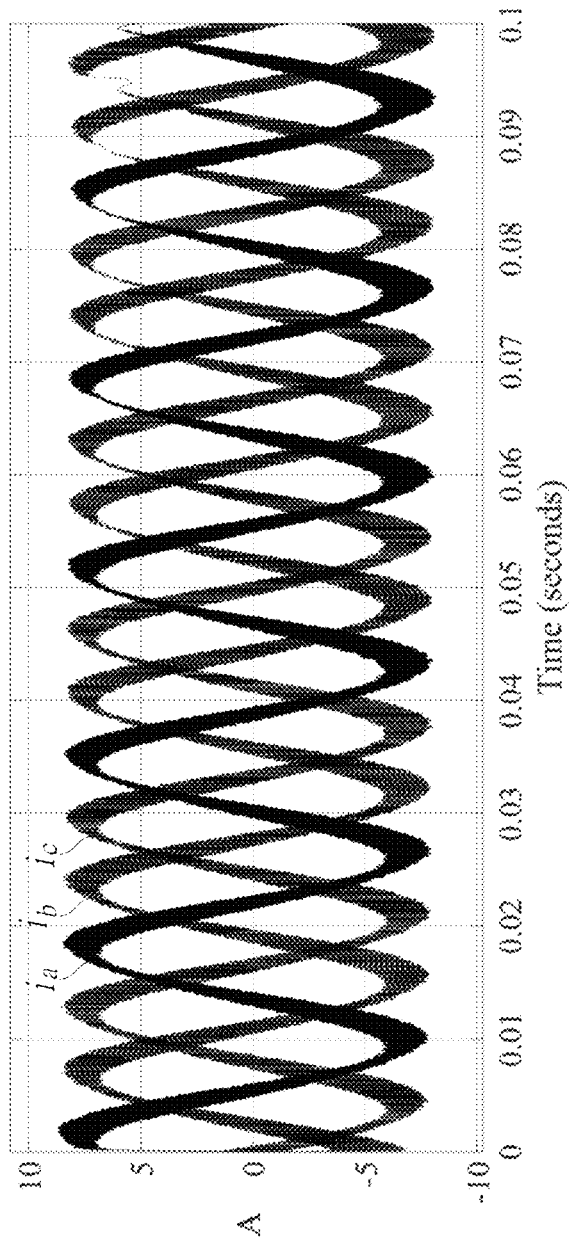
Figure 8C:
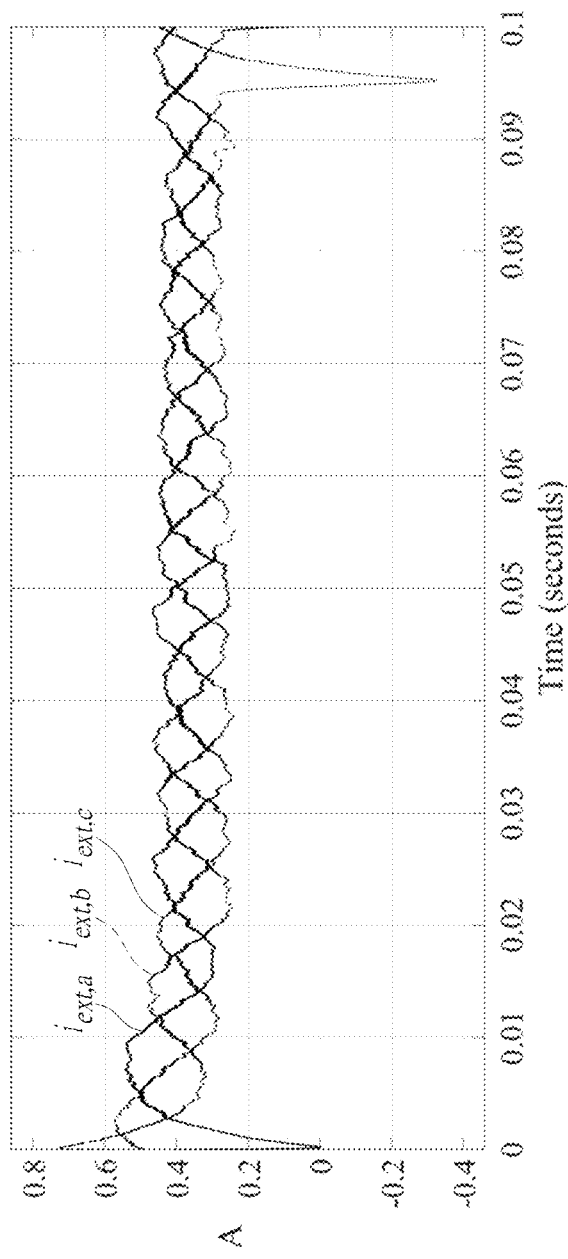
Figure 8D:
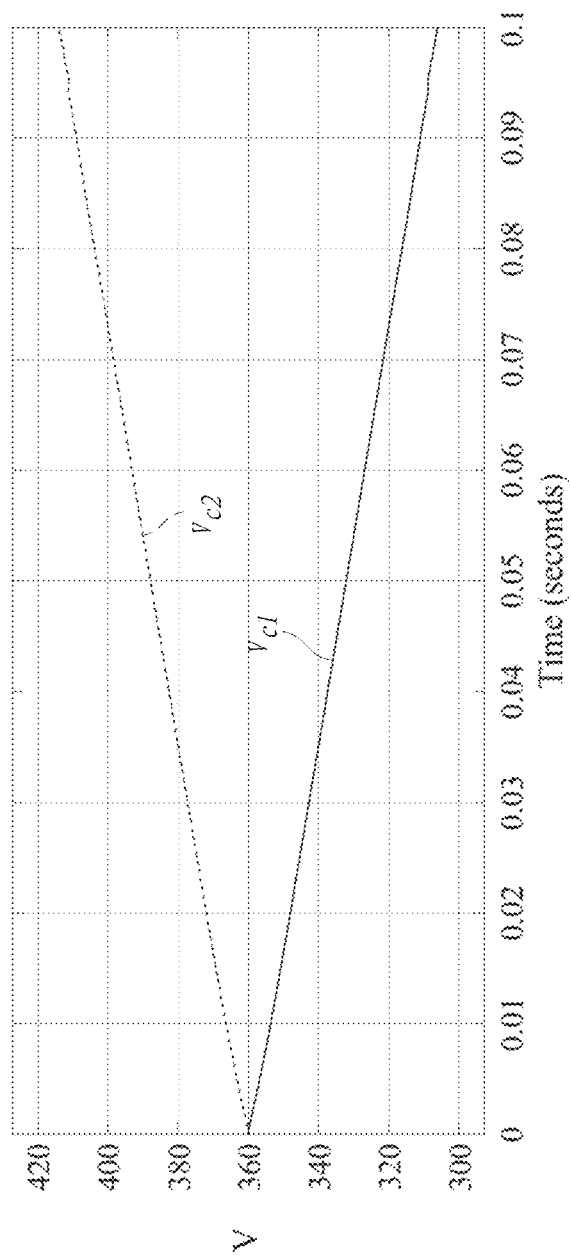
Figure 9A:
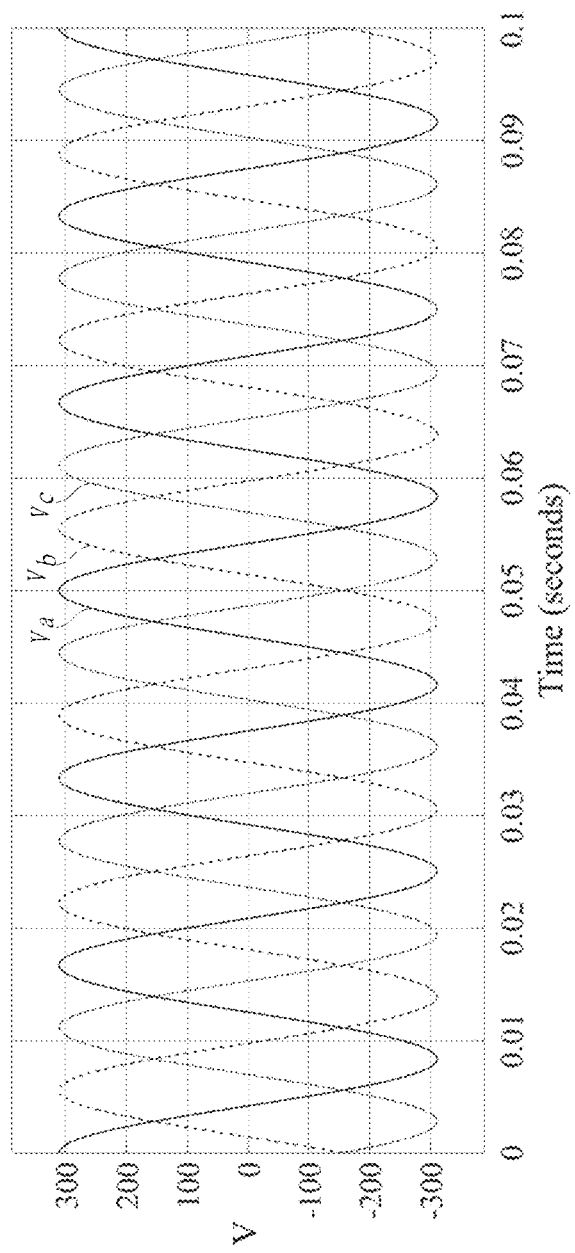
FIGS. 9A to 9D are waveform diagrams over time for the three-phase AC voltages, three-phase AC currents, three-phase current offsets, and capacitor voltages during the second test scenario of a conventional power conditioner.
Figure 9B:
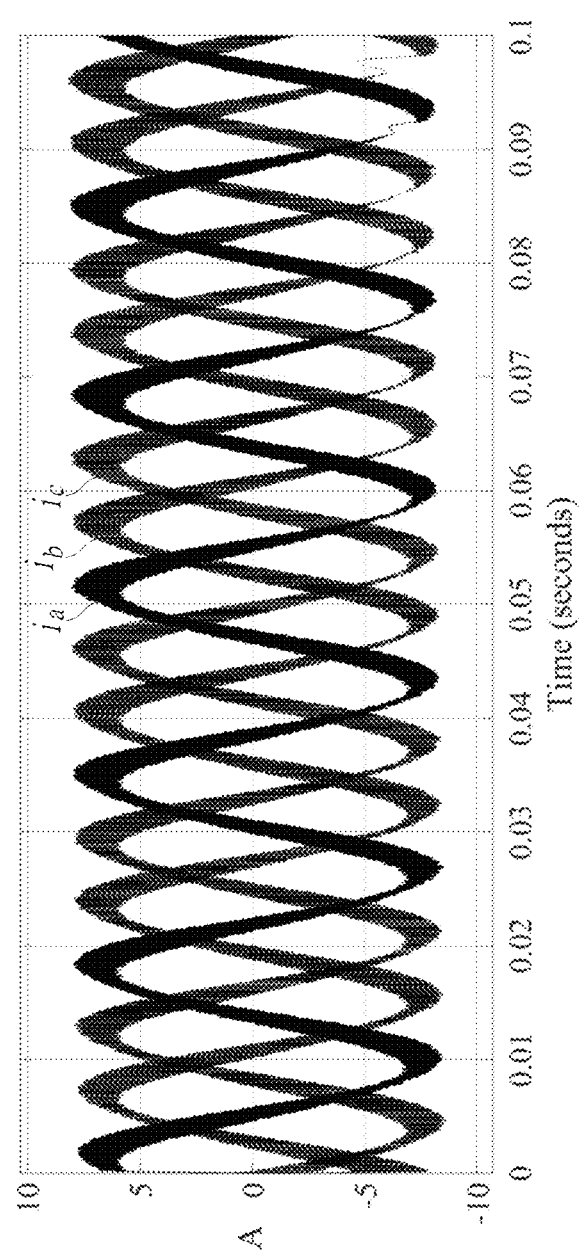
Figure 9C:
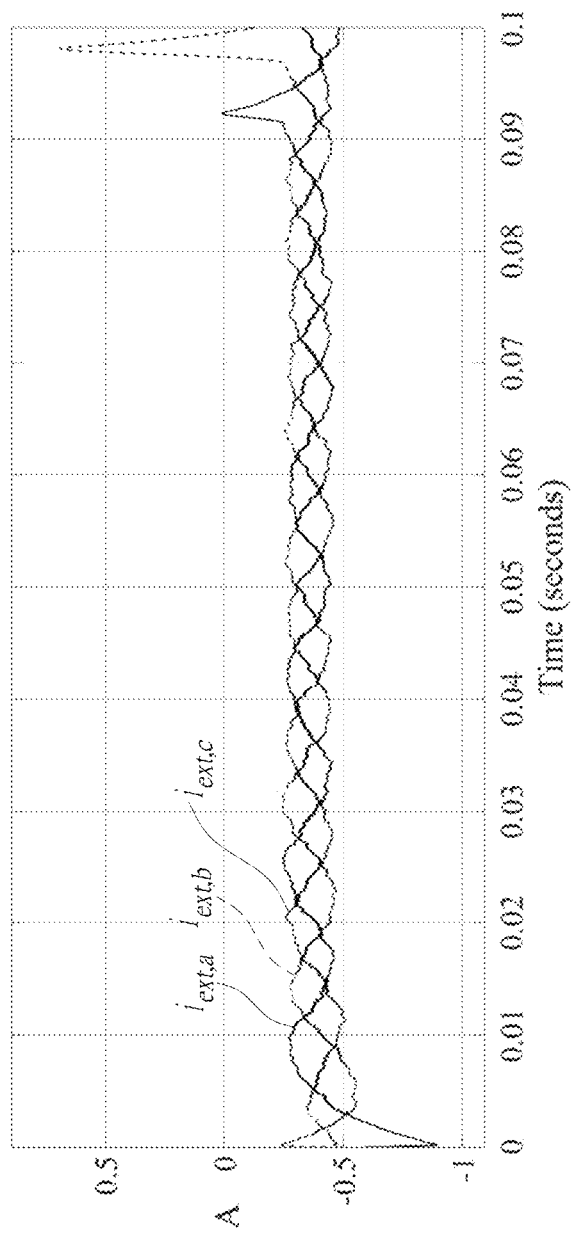
Figure 9D:
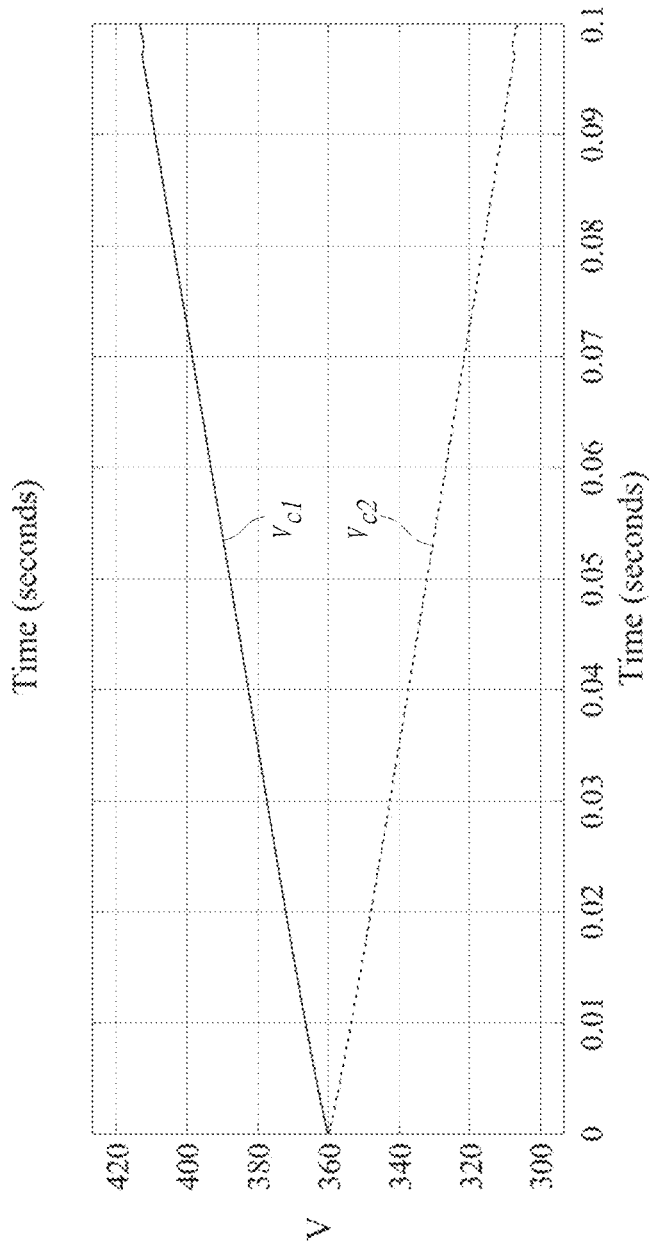
Figure 10A:
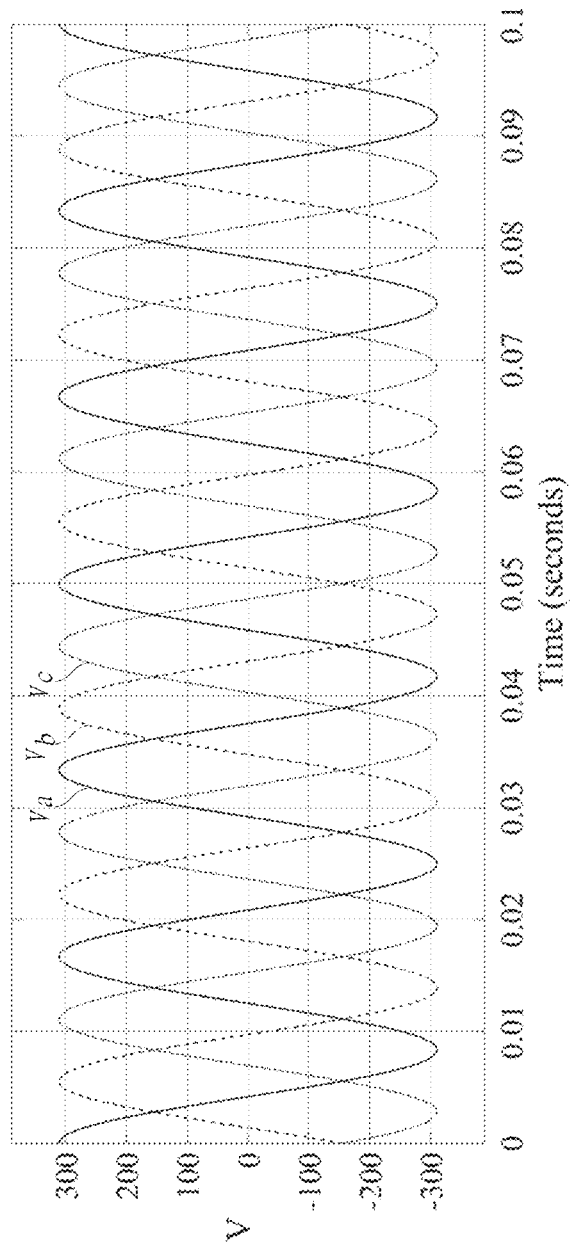
FIGS. 10A to 10D are waveform diagrams over time for the three-phase AC voltages, three-phase AC currents, three-phase current offsets, and capacitor voltages during the third test scenario of a conventional power conditioner.
Figure 10B:
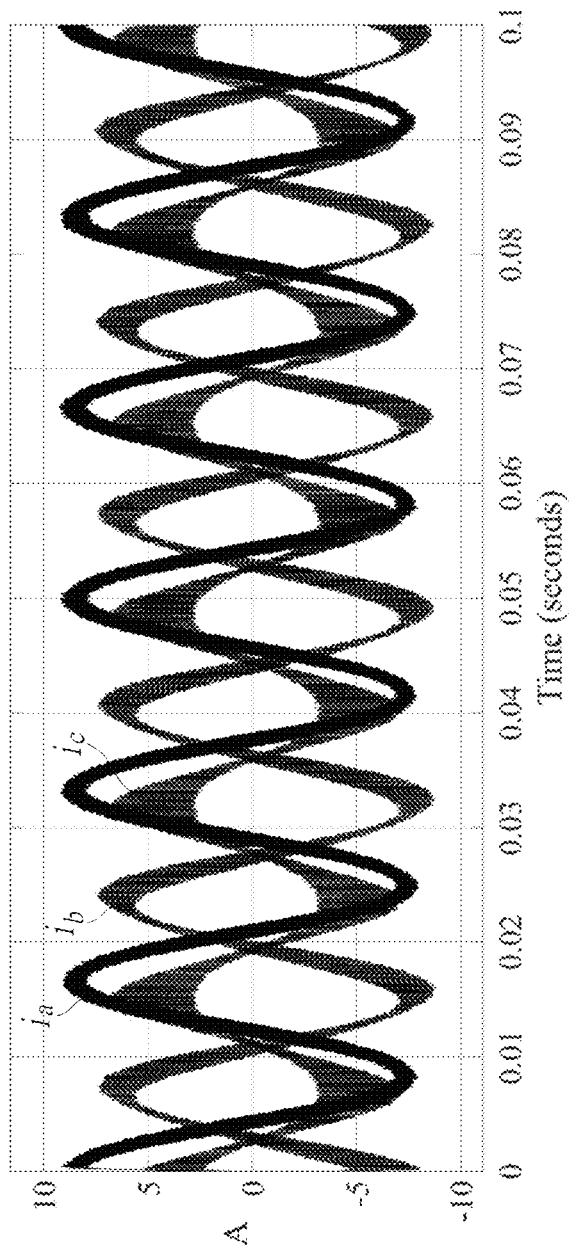
Figure 10C:
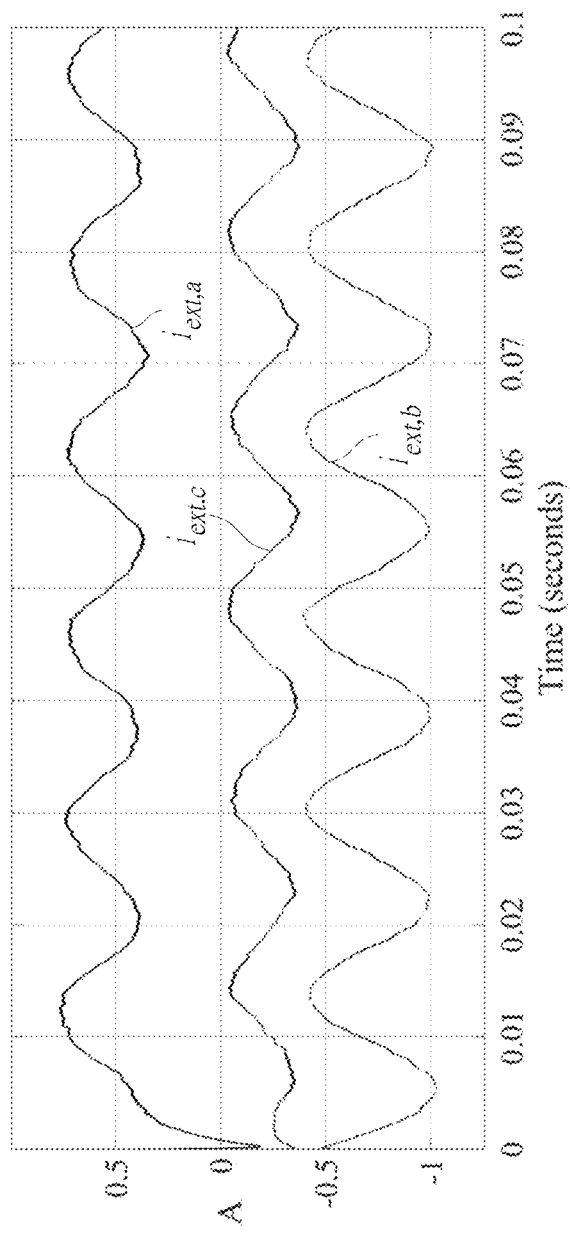
Figure 10D:
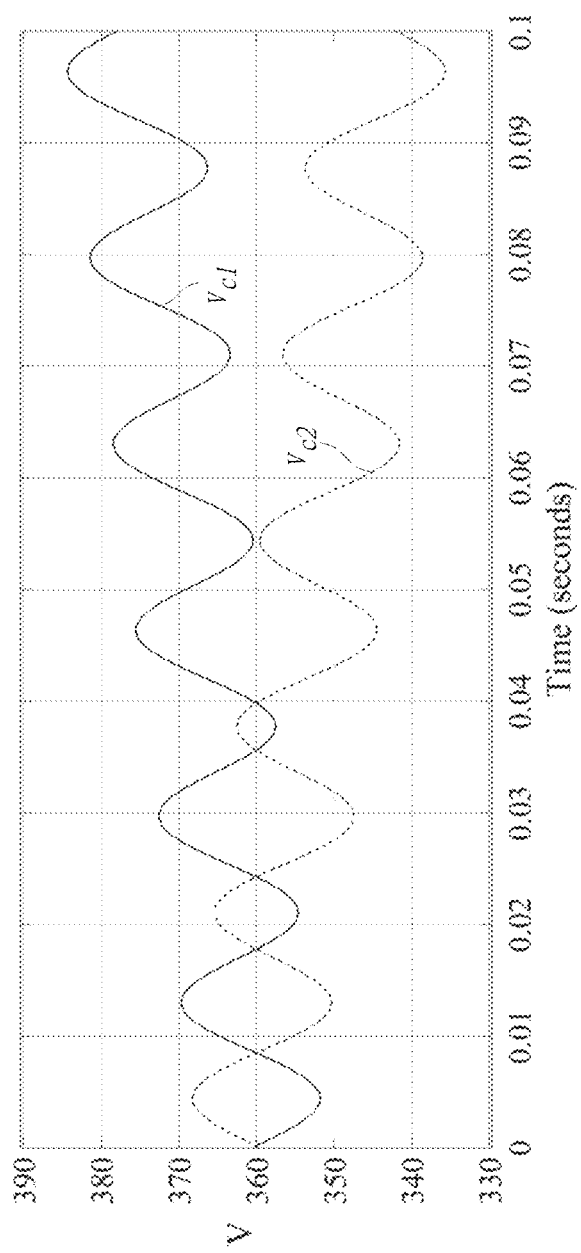

With reference to FIG. 3, the measured voltage value $v_{x,fb}$ includes DC voltage component $v_{dc}$ and AC voltage component $v_{ac,x}$. The measured current value is comprises a real current value as well as a measurement error value $\Delta i_{dev,x}$. The control module 4 contains a compensation computing circuitry 41, a command computation processor 42, a PWM command generator 43, and a PWM circuitry 44. The command computation processor 42 is connected to the measurement unit 3 to receive the DC voltage component $v_{dc}$ from the measured voltage value $v_{x,fb}$ and also receives the target real power value $P_{ref,abc}$ and the target reactive power value $Q_{ref,abc}$ from an external controller, thereby producing the target current value $i_x^*$. The PWM command generator 43 is connected to the command computation processor 42 and the measurement unit 3, receives the target current value $i_x^*$ from the command computation processor 42, and receives both the DC voltage component $v_{dc}$ and the AC voltage component $v_{ac,x}$ from the measurement unit 3. Based on the target current value $i_x^*$, DC voltage component vdc, and AC voltage component $V_{ac,x}$, it generates the ideal control signal $v_{s1,x}$. The compensation computing circuitry 41 is connected to the command computation processor 42, the measurement unit 3, and the PWM command generator 43. It receives the ideal control signal $v_{s1,x}$ from the PWM command generator 43, the target current value $i_x^*$ from the command computation processor 42, and the measured current value $i_{x,fb}$ from the measurement unit 3. The compensation computing circuitry then executes the compensation mechanism to produce the compensated control signal $v_{s2,x}$.

It should be noted that, the method that the PWM command generator 43 produces the ideal control signal $v_{s1,x}$ based on the target current value $i_x^*$, the DC voltage component $v_{dc}$, and the AC voltage component $v_{ac,x}$ may be executed with reference to, for example, formulas 5-7 and 8-9 in the paper titled "Per-Phase Active Power Distribution Strategy for Three-Phase Grid-Tied Inverters Under Unbalanced Conditions Without DC Sources" by T. W. Tsai, Y. C. Li, C. J. Yang, and Y. M. Chen, Vol. 9. No. 6, December 2021, and makes the following assumptions:

$$\theta_{vac,x} = 0$$

$$P_{comp} = 0$$

The PWM circuitry 44 is connected to the compensation computing circuitry 41 of the control module 4 to receive the compensated control signal $v_{s2,x}$ and generates the PWM control signals $v_{ga1}$-$v_{ga2}$, $v_{gb1}$-$v_{gb2}$, and $v_{gc1}$-$v_{gc2}$ to output to the power conversion module 2. To be more specific, the PWM control signals generated by one of the control modules 4 consist of two sub-signals. For instance, the control module 4a produces the PWM control signals $v_{ga1}$ and $v_{ga2}$, which individually control the two switches 211 connected in series within the power conversion module 2.

With reference to also FIG. 3, the measured current value $i_{x,fb}$ of the three-phase AC current as detected by the measurement unit 3 will contain an additional current measurement error value $\Delta i_{dev,x}$ due to the imperfections in the circuitry of the measurement unit 3. Each phase current measurement error value $\Delta i_{dev,x}$ is then transferred to the compensation computing circuitry 41 of the control module 4. The compensation computing circuitry 41 includes a first calculator 411, a second calculator 412, a first proportional amplifier 413, an integral amplifier 414, a second proportional amplifier 415, and a third calculator 416. The first calculator 411 receives the measured current value $i_{x,fb}$ and the target current value $i_x^*$, subtracting the measured current value $i_{x,fb}$ from the target current value $i_x^*$ to produce the first difference value $e_{1,x}$. The second calculator 412 is connected to the first calculator 411, receives the first difference value $e_{1,x}$, subtracts the feedback value $e_{5,x}$ from the first difference value $e_{1,x}$, and generates a second output value $e_{2,x}$. The first proportional amplifier 413 is connected to the second calculator 412 and receives the second output value $e_{2,x}$. Based on the second output value $e_{2,x}$ and a first gain parameter $K_{1,x}$, it produces the first proportional amplified difference value $e_{3,x}$. The integral amplifier 414 is connected to the second calculator 412 and receives the second output value $e_{2,x}$. It integrates the second output value $e_{2,x}$ over relative time according to the integral gain parameter $K_{3,x}\int$ to produce an integral amplified difference value $e_{4,x}$. The second proportional amplifier 415 is connected to the integral amplifier 414 and the second calculator 412, receives the integral amplified difference value $e_{4,x}$, and based on a second gain parameter $K_{2,x}$ produces a feedback value $e_{5,x}$, which is then outputted to the second calculator 412. The third calculator 416 is connected to the first proportional amplifier 413 to receive the first proportional amplified difference value $e_{3,x}$, is connected to the integral amplifier 414 to receive the integral amplified difference value $e_{4,x}$, and also is connected to the PWM command generator 43 to receive the ideal control signal $v_{s1,x}$. The third calculator 416 adds the first proportional amplified difference value $e_{3,x}$, the integral amplified difference value $e_{4,x}$, and the ideal control signal $v_{s1,x}$ to produce the compensated control signal $v_{s2,x}$.

In the following, the first gain parameter $K_{1,x}$ for each phase's first proportional amplifier 411 is simplified as the first gain parameter $K_1$. The second gain parameter $K_{2,x}$ of the second proportional amplifier 415 is simplified as the second gain parameter $K_2$. The integral gain parameter $K_{3,x}\int$ of the integral amplifier 414 is simplified as the integral gain parameter $K_3$. In an embodiment of the present invention, the integral gain parameter $K_3$ is larger than the second gain parameter $K_2$, the second gain parameter $K_2$ is larger than the first gain parameter $K_1$, and the first gain parameter is larger than 0. In other words:

$$K_3 > K_2 > K_1 > 0$$

In one embodiment, the integral gain parameter $K_3$ is larger than 10 times the first gain parameter $K_1$.

In another embodiment, the integral gain parameter $K_3$ is larger than 10 times the second gain parameter $K_2$.

Test results of a simulated power conditioner of the present invention under simulated AC current measurement errors are provided herein to elaborate the effectiveness of the present invention. Table 2 lists the parameters of the power conditioner used for simulation and the three-phase four-wire AC grid. The simulation tests include three different sets of three-phase target real and reactive power values and measurement error amounts.

TABLE 2

| | |
|---|---|
| Power converter 21 rated power: | 3.5 kVA |
| Rated three-phase voltage RMS ($v_a$, $v_b$, $v_c$): | 220 V |
| DC-end voltage | 720 V |
| Inductance (L) value: | 1.5 mH |
| Capacitor (221, 222) value | 1 mF |
| PWM control signal frequency ($v_{ga1}$-$v_{ga2}$, $v_{gb1}$-$v_{gb2}$, $v_{gc1}$-$v_{gc2}$) | 30 kHz |
| First gain parameter K1 | 1 |
| Second gain parameter K2 | 2.25 |
| Integral gain parameter K3 | 100 |

First test scenario: All three phases having a target real power value of $P_{ref}$=1 kW and a target reactive power value of $Q_{ref}$=0.5 KVA, and the current measurement error for each phase is set at +0.5 A.

FIGS. 4A to 4D sequentially show the simulated result waveforms over time for the AC voltages $v_a$, $v_b$, $v_c$, AC currents $i_a$, $i_b$, $i_c$, current offsets $i_{ext,a}$, $i_{ext,b}$, $i_{ext,c}$, and the capacitors voltages $V_{C1}$ and $V_{C2}$ under the first test scenario. As shown in FIGS. 4A to 4D, under the compensation mechanism of the invention, the offset current flowing through the neutral line is 0A, and the voltages of upper capacitor 221 and lower capacitor 222 eventually stabilize at 352V and 368V, respectively. This demonstrates that in the first test scenario, this embodiment can maintain the capacitor voltages $V_{C1}$, $V_{C2}$ near the midpoint of the DC voltage ($V_{dc}/2$).

Second test scenario: All three phases having a target real power value of $P_{ref}=1$ kW and a target reactive power value of $Q_{ref}=0.5$ KVA, and the current measurement error for each phase is set at −0.5 A.

FIGS. 5A to 5D sequentially show the simulated result waveforms over time for the AC voltages $v_a$, $v_b$, $v_c$, AC currents $i_a$, $i_b$, $i_c$, current offsets $i_{ext,a}$, $i_{ext,b}$, $i_{ext,c}$, and the capacitors voltages $v_{C1}$ and $v_{C2}$ under the second test scenario. As shown in FIGS. 5A to 5D, under the compensation mechanism of the invention, the offset current flowing through the neutral line is 0 A, and the voltages of upper capacitor 221 and lower capacitor 222 eventually stabilize at 368V and 352V, respectively. This demonstrates that in the second test scenario, this embodiment can maintain the capacitor voltages $v_{C1}$ and $v_{C2}$ near the midpoint of the DC voltage (Vdc/2).

Third test scenario: Three phases having different target real and reactive powers, namely, the target power information and the current measurement error are set differently. Phase A: $P_{ref,a}=1.25$ KW, $Q_{ref,a}=0$ KVA; phase B: $P_{ref,b}=1$ KW, $Q_{ref,b}=0.5$ KVA; phase C: $P_{ref,c}=0$ KW, $Q_{ref,c}=0.75$ KVA. Current measurement error of Phase A is 0.5 A, current measurement error of Phase B is −0.75 A, and current measurement error of Phase C is −0.25 A.

FIGS. 6A to 6D sequentially show the simulated result waveforms over time for the AC voltages $v_a$, $v_b$, $v_c$, AC currents $i_a$, $i_b$, $i_c$, current offsets $i_{ext,a}$, $i_{ext,b}$, $i_{ext,c}$, and the capacitors voltages $v_{c1}$ and $v_{c2}$ under the second test scenario. As shown in FIGS. 6A to 6D, under the compensation mechanism of the invention, the offset current flowing through the neutral line is 0A, and the average voltages of the upper capacitor 221 and lower capacitor 222 eventually stabilize at 368V and 352V with lower AC ripple compared to a power conditioner without compensation mechanism of the invention, respectively. This demonstrates that in the third test scenario, this embodiment can maintain the capacitor voltages $v_{C1}$ and $v_{C2}$ near the midpoint of the DC voltage (Vdc/2).

In summary, the power conditioner of the invention possesses at least the following advantages:

The neutral line offset current caused by current measurement errors is eliminated in the measurement unit 3, and the current measurement errors are compensated regardless of the polarity.

Through the compensation operation circuit 41 in the control module 4, the voltage deviation of the upper capacitor 221 and lower capacitor 222 can be quickly and effectively controlled without the need to add an additional capacitor voltage control loop. This stabilizes the capacitor voltages at the midpoint of the DC voltage, avoiding operational issues in the power conditioner due to capacitor voltage problems.

What is claimed is:

1. A power conditioner with a neutral line bias current compensation function, connected between a direct current (DC) source and an alternating current (AC) grid, the power conditioner comprising:
    a power conversion module, having two DC input terminals connected to the DC source and at least one AC output terminal connected to the AC grid, and including two capacitors connected in series between the two DC input terminals, with one connection point of the two capacitors connected to a neutral point of the AC grid;
    at least one measurement unit, connected to the at least one AC output terminal of the power conversion module for voltage and current measurements, generating a measured voltage value and a measured current value; and
    at least one control module, connected to the at least one measurement unit and to the power conversion module, generating an ideal control command based on a target power information and the measured voltage value, and comprising a compensation computation mechanism; the compensation computation mechanism performing signal compensation on the ideal control command to produce a compensated control command; the at least one control module producing and outputting a pulse width modulation (PWM) signal to the power conversion module based on the compensated control command; the compensation computation mechanism comprising:
    subtracting the measured current value from a target current value to obtain a first difference value; subtracting a feedback value from the first difference value and passing a subtracted outcome through a first proportional amplifier to produce a first proportional amplified difference value; passing the subtracted outcome through an integral amplifier to produce a first integral amplified difference; passing the first integral amplified difference through a second proportional amplifier to produce the feedback value; wherein
    the first integral amplified difference and the first proportional amplified difference value are used to compensate the ideal control command; and
    wherein the at least one control module comprises:
        a command computation processor, connected to the at least one measurement unit to receive the measured voltage value, receiving the target power information from an external controller, and generating the target current value according to the target power information;
        a PWM command generator, connected to the command computation processor and to the at least one measurement unit, and generating the ideal control command based on the target current value and the measured voltage value;
        a compensation computation circuit, connected to the command computation processor, the at least one measurement unit, and to the PWM command generator, receiving the ideal control command, the target current value, and the measured current value, and executing the compensation computation mechanism to produce the compensated control command; and
        a PWM circuit, connected to the compensation computation circuit, receiving the compensated control command, and generating the PWM signal base on the compensated control command.

2. The power conditioner as claimed in claim 1, wherein:
the AC grid is a three-phase four-wire AC grid, having three phase terminals;
the number of the at least one AC output terminal, the at least one measurement unit, and the at least one control module is three, respectively;
the three AC output terminals are connected to the three phase terminals of the AC grid to output three-phase voltages;
the power conversion module comprises a power converter, the power converter includes three upper-arm switches, three lower-arm switches, and three inductors; the three upper-arm switches and the three lower-arm switches are pairwise connected in series between the two DC input terminals; and
the three control modules are electrically connected respectively with the three upper-arm switches and the three lower-arm switches, outputting the PWM signals to the three upper-arm switches and the three lower-arm switches, enabling the DC source to output phase voltages respectively to the three phase terminals through the three upper-arm switches and the three lower-arm switches.

3. The power conditioner as claimed in claim 1, wherein the compensation computation mechanism is executed by the compensation computation circuit, and the compensation computation circuit comprises:
a first calculator, receiving the measured current value and the target current value, subtracting the measured current value from the target current value, and generating the first difference value;
a second calculator, connected to the first calculator to receive the first difference value, subtracting the feedback value from the first difference value, and generating the subtracted outcome;
the first proportional amplifier, connected to the second calculator to receive the subtracted outcome, and producing the first proportional amplified difference value based on the subtracted outcome and a first gain parameter;
the integral amplifier, connected to the second calculator to receive the subtracted outcome, integrating the subtracted outcome over time based on an integral gain parameter, and generating the first integral amplified difference;
the second proportional amplifier, connected to the integral amplifier and to the second calculator to receive the first integral amplified difference, producing the feedback value based on the first integral amplified difference and a second gain parameter, and outputting the feedback value to the second calculator; and
a third calculator, connected to the first proportional amplifier to receive the first proportional amplified difference value, connected to the integrator amplifier to receive the first integral amplified difference, and connected to the PWM command generator to receive the ideal control command, the third calculator adding up the first proportional amplified difference value, the first integral amplified difference, and the ideal control command to produce the compensated control command.

4. The power conditioner as claimed in claim 3, wherein the integral gain parameter is larger than ten times the second gain parameter.

5. The power conditioner as claimed in claim 1, wherein the first proportional amplifier has a first gain parameter, the second proportional amplifier has a second gain parameter, and the integral amplifier has an integral gain parameter; wherein
the integral gain parameter is larger than the second gain parameter, the second gain parameter is larger than the first gain parameter, and the first gain parameter is larger than 0.

6. The power conditioner as claimed in claim 5, wherein the integral gain parameter is larger than ten times the first gain parameter.

7. A control method of a power conditioner with a neutral line bias current compensation function, the power conditioner connected between a DC source and an AC grid and controlling power transferring between the DC source and the AC grid; the control method comprising:
receiving a measured voltage value and a measured current value, receiving a target power information, and producing an ideal control command according to the measured voltage value and the target power information;
executing a compensation calculation mechanism, performing signal compensation on the ideal control command to produce a compensated control command; and
producing a PWM signal and outputting the PWM signal to a power conversion module according to the compensated control command; the compensation calculation mechanism comprising:
subtracting the measured current value from a target current value to obtain a first difference value; subtracting a feedback value from the first difference value and passing a subtracted outcome through a first proportional amplifier to produce a first proportional amplified difference value; passing the subtracted outcome through an integral amplifier to produce a first integral amplified difference; passing the first integral amplified difference through a second proportional amplifier to produce the feedback value; wherein
the first integral amplified difference and the first proportional amplified difference value are used to compensate the ideal control command; and
wherein the control method further comprises:
receiving the measured voltage value, receiving the target power information, and generating the target current value according to the target power information;
generating the ideal control command based on the target current value and the measured voltage value;
receiving the ideal control command, the target current value and the measured current value, and executing the compensation calculation mechanism to produce the compensated control command; and
receiving the compensated control command and generating the PWM signal based on the compensated control command.

8. The control method as claimed in claim 7, wherein the first proportional amplifier has a first gain parameter, the second proportional amplifier has a second gain parameter, and the integral amplifier has an integral gain parameter; wherein
the integral gain parameter is larger than the second gain parameter, the second gain parameter is larger than the first gain parameter, and the first gain parameter is larger than 0.

9. The control method as claimed in claim 8, wherein the integral gain parameter is larger than ten times the first gain parameter.

10. The control method as claimed in claim 8, wherein the integral gain parameter is larger than ten times the second gain parameter.

* * * * *